United States Patent
Lashina et al.

(10) Patent No.: US 9,989,218 B2
(45) Date of Patent: Jun. 5, 2018

(54) METHODS AND APPARATUS FOR ADJUSTING A LIGHTING PARAMETER IN A LIGHT MANAGEMENT SYSTEM BASED ON USER ACTION

(71) Applicant: PHILIPS LIGHTING HOLDING B.V., Eindhoven (NL)

(72) Inventors: Tatiana Aleksandrovna Lashina, Eindhoven (NL); Jolijn Teunisse, Eindhoven (NL); Kars-Michiel Hubert Lenssen, Veldhoven (NL); Sanae Chraibi, Eindhoven (NL); Paul Anthony Shrubsole, Arnhem (NL); Dzmitry Viktorovich Aliakseyeu, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 553 days.

(21) Appl. No.: 14/431,982

(22) PCT Filed: Sep. 4, 2013

(86) PCT No.: PCT/IB2013/058281
§ 371 (c)(1),
(2) Date: Mar. 27, 2015

(87) PCT Pub. No.: WO2014/049473
PCT Pub. Date: Apr. 3, 2014

(65) Prior Publication Data
US 2015/0226406 A1    Aug. 13, 2015

Related U.S. Application Data

(60) Provisional application No. 61/707,140, filed on Sep. 28, 2012.

(51) Int. Cl.
*F21V 23/04* (2006.01)
*G01J 1/20* (2006.01)
(Continued)

(52) U.S. Cl.
CPC ............ *F21V 14/08* (2013.01); *F21V 23/003* (2013.01); *H05B 37/0218* (2013.01); *Y02B 20/46* (2013.01)

(58) Field of Classification Search
CPC ..... H05B 37/0218; Y02B 20/46; F21V 14/08; F21V 23/0464; F21V 11/02
(Continued)

(56) References Cited

U.S. PATENT DOCUMENTS 4,236,101 A * 11/1980 Luchaco .............. H05B 39/042
                                                     250/214 AL
5,357,170 A    10/1994 Luchaco et al.
(Continued)

FOREIGN PATENT DOCUMENTS

CN        101421558 A    4/2009

OTHER PUBLICATIONS

Heschong Mahone Group, Inc., Sidelighting Photocontrols Field Study. Final Report Nov. 1, 2005, pp. 1-186.
(Continued)

*Primary Examiner* — William N Harris
(74) *Attorney, Agent, or Firm* — Meenakshy Chakravorty

(57) ABSTRACT

Methods and apparatus for adjusting at least one lighting parameter based on user action. For example, methods and apparatus adjust one of a minimum set point and a maximum set point in response to a user manipulation of a component of a light management system (10, 110). The adjusted at least one of the minimum set point and the maximum set point are adjusted based on a measured interior illuminance
(Continued)

value after the user manipulation. The set points may be indicative of user desired levels of interior illuminance.

17 Claims, 5 Drawing Sheets

(51) Int. Cl.
    *F21V 14/08* (2006.01)
    *H05B 37/02* (2006.01)
    *F21V 23/00* (2015.01)

(58) Field of Classification Search
    USPC .................................. 362/276; 250/201.1
    See application file for complete search history.

(56) References Cited

U.S. PATENT DOCUMENTS

| | | | |
|---|---|---|---|
| 7,111,952 B2* | 9/2006 | Veskovic | E06B 9/32 160/5 |
| 7,736,014 B2* | 6/2010 | Blomberg | E04D 13/033 359/591 |
| 7,941,245 B1 | 5/2011 | Popat | |
| 8,779,681 B2* | 7/2014 | Adler | F21S 2/00 315/291 |
| 2002/0060283 A1* | 5/2002 | Jordan | H05B 39/042 250/205 |
| 2009/0020233 A1 | 1/2009 | Berman et al. | |
| 2011/0251720 A1 | 10/2011 | Neuman | |
| 2012/0029704 A1 | 2/2012 | Ackermann | |

OTHER PUBLICATIONS

Anca D. Galasiu et al, Occupant preferences and satisfaction with the luminous environment and control systems in daylit offices: a literature review, Elsevier, Energy and Buildings 38, (2006) pp. 728-742.

J.A. Veitch, "Research matters (indivdual control benefits people and employers)", Lighting Design + Application: LD + A 38, (3), pp. 22, 24, 26, 28, (2008).

Satyen Mukherjee et al, "Closed Loop Integrated Lighting and Daylighting Control for Low Energy Buildings", ACEEE Summer Study on Energy Efficiency in Buildings, Aug. 2010, Philips Research North America.

* cited by examiner

METHODS AND APPARATUS FOR ADJUSTING A LIGHTING PARAMETER IN A LIGHT MANAGEMENT SYSTEM BASED ON USER ACTION

CROSS-REFERENCE TO PRIOR APPLICATIONS

This application is the U.S. National Phase application under 35 U.S.C. § 371 of International Application No. PCT/IB2013/058281, filed on Sep. 4, 2013, which claims the benefit of U.S. Provisional Patent Application No. 61/707,140, filed on Sep. 28, 2012. These applications are hereby incorporated by reference herein.

TECHNICAL FIELD

The present invention is directed generally to adjusting at least one lighting parameter based on user action. More particularly, various inventive methods and apparatus disclosed herein relate to adjusting a lighting parameter in a light management system based on user interaction with controls associated with light generating and/or light blocking elements associated with the light management system.

BACKGROUND

Light management systems have been implemented that attempt to balance the admission of natural daylight and the application of artificial lighting in interior environments. The light management systems are intended to offer the benefit of energy savings via utilization of natural daylight under certain conditions, while maintaining a comfortable lighting environment for occupants of the interior environments.

Some light management systems provide automatic control of blinds or other light blocking elements in the building to selectively omit and/or allow varying degrees of natural daylight to enter the interior environment.

Some light management systems further provide automatic control of artificial lights in the building to selectively provide artificial lighting to the interior environment. For example, artificial lighting may be provided when natural daylight alone is insufficient to provide desired lighting in the interior environment (e.g., when it is dark outside).

The automatic operation mode of the light management systems may be complemented by a manual operation mode in which a user can override the automatic operation and manually adjust the lights and/or the blinds. For example, users may switch the light management system to a manual mode and dim the lights and/or adjust the height of the blinds and/or the angle of slats of the blinds directly while in the manual mode. Also, for example, user control actions in the automatic mode may override the automatic mode and switch the system temporarily into the manual mode. After a timeout period, the system may then automatically switch back into the automatic mode. This temporal switching into the manual mode by a user does not have any effect on the system operation in the automatic mode. Manual modes may enable user change to the light management system but do not offer benefits of automatic modes, e.g. convenience. Also, the automatic mode of the light management systems exhibit a rigid behavior based on a fixed desired lighting set-point pre-programmed at the factory and/or set at installation. Such fixed set-point may not provide desired luminance to certain users and/or in certain situations.

Thus, there is a need in the art to provide methods and apparatus for a light management system that may provide automatic operation tailored to user interactions with the light management system.

SUMMARY

The present disclosure is directed to inventive methods and apparatus for adjusting at least one lighting parameter based on user action. For example, methods and apparatus may adjust one of a minimum set point and a maximum set point in response to a user manipulation of a component of a light management system. The adjusted at least one of the minimum set point and the maximum set point may be adjusted based on a measured interior illuminance value after the user manipulation. The set points may be indicative of user desired levels of interior illuminance.

Generally, in one aspect, a method of adjusting a lighting parameter in a light management system based on user action is provided and includes the steps of: identifying a user manipulation of a light management system component, the user manipulation including one of a user light manipulation of at least one light of a light management system and a user blind manipulation of at least one light blocking element of the light management system; identifying an interior illuminance value indicative of an actual interior illuminance after the user manipulation; adjusting, in response to the user manipulation, one of a minimum set point and a maximum set point; wherein the at least one of the minimum set point and the maximum set point is adjusted based on the interior illuminance value after the user manipulation; wherein the maximum set point is indicative of an occupied maximum desired level of the actual interior illuminance; and wherein the minimum set point is indicative of an occupied minimum desired level of the actual interior illuminance.

In some embodiments, the method further includes adjusting the maximum set point in response to the user blind manipulation when the interior illuminance value is greater than the minimum set point, and wherein the maximum set point is adjusted based on the interior illuminance value after the user manipulation. In some versions of those embodiments the maximum set point is adjusted to substantially equal the interior illuminance value after the user manipulation when adjusted in response to the user blind manipulation when the interior illuminance value is greater than the minimum set point.

In some embodiments, the method further includes adjusting the maximum set point in response to the user blind manipulation when the interior illuminance value is less than the minimum set point, and wherein the maximum set point is adjusted based on the minimum set point. In some versions of those embodiments the maximum set point is adjusted to substantially equal the minimum set point when adjusted in response to the user blind manipulation when the interior illuminance value is less than the minimum set point.

In some embodiments, the method further includes adjusting the maximum set point based on the minimum set point modified by a factor.

In some embodiments, the method further includes adjusting the minimum set point in response to the user light manipulation when the interior illuminance value is less than the maximum set point, and the minimum set point is adjusted based on the interior illuminance value after the user manipulation. In some versions of those embodiments the minimum set point is adjusted in response to the user light manipulation when the interior illuminance value is less than the maximum set point to substantially equal the interior illuminance value.

In some embodiments, the method further includes adjusting the maximum set point in response to the user light manipulation when the interior illuminance value is greater than the maximum set point, and wherein the maximum set point is adjusted based on the interior illuminance value. In some versions of those embodiments the maximum set point is adjusted in response to the user light manipulation when the interior illuminance value is greater than the maximum set point to substantially equal the interior illuminance value.

In some embodiments, the at least one light blocking element includes blind slats.

In some embodiments, the method further includes increasing a light output of the lights when the interior illuminance value is less than the minimum set point. In some versions of those embodiments the method further includes decreasing a light output of the lights when the interior illuminance value is greater than the minimum set point. In some versions of those embodiments the method further includes increasing an amount of light passage of the blind slats when the interior illuminance value is less than the maximum set point. In some versions of those embodiments the method further includes decreasing the amount of light passage of the blind slats when the interior illuminance value is greater than the maximum set point.

In some embodiments, the maximum set point is based on at least one of an occupied maximum desired level of window brightness and a maximum desired level of surface luminance.

Generally, in another aspect, a method of adjusting a lighting parameter in a light management system based on user actions is provided and includes the steps of: identifying a user light manipulation of at least one light of a light management system; identifying an interior illuminance value indicative of an actual interior illuminance; adjusting a minimum set point in response to the user light manipulation; wherein the minimum set point is adjusted in response to the user light manipulation when the interior illuminance value after the light manipulation is less than the maximum set point and is adjusted based on the interior illuminance value after the light manipulation; identifying a user light blocking element manipulation of at least one light blocking element associated with the light management system; and adjusting a maximum set point in response to the user light blocking element manipulation; wherein the maximum set point is adjusted in response to the user light blocking element manipulation and is adjusted based on the interior illuminance value after the light blocking element manipulation; wherein the maximum set point is indicative of an occupied maximum desired level of the actual interior illuminance; and wherein the minimum set point is indicative of an occupied minimum desired level of the actual interior illuminance.

In some embodiments, the maximum set point is adjusted based on the interior illuminance value when the interior illuminance value is greater than the minimum set point. In some embodiments the method further includes adjusting the maximum set point in response to the user light manipulation when the interior illuminance value after the light manipulation is greater than the maximum set point, and wherein the maximum set point is adjusted based on the interior illuminance value after the light manipulation.

Generally, in another aspect, a controller for a light management system having a light source, light blocking element, and a light sensor is provided. The controller includes a user action input, a light sensor input, and an adjustment output. The user action input provides identification of a user manipulation of a light management system component. The user manipulation includes one of a user light manipulation of at least one light of a light management system and a user light blocking element manipulation of at least one light blocking element of the light management system. The light sensor input identifies an interior illuminance value indicative of an actual interior illuminance after the user manipulation. The adjustment output outputs signals that adjust the light blocking element and the light management system component based on a minimum set point and a maximum set point. The controller adjusts at least one of the maximum set point and the minimum set point based on the interior illuminance value identified via the light sensor input after the user manipulation as identified via the user action input. The maximum set point is indicative of an occupied maximum desired level of the actual interior illuminance. The minimum set point is indicative of an occupied minimum desired level of the actual interior illuminance.

Generally, in another aspect, a light management system is provided and includes a light source, a light blocking element, a light sensor, and a controller. The controller has a user action input, a light sensor input, and an adjustment output. The user action input provides identification of a user manipulation of a light management system component. The user manipulation includes one of a user light manipulation of at least one light of a light management system and a user light blocking element manipulation of at least one light blocking element of the light management system. The light sensor input is in communication with the light sensor and identifies an interior illuminance value indicative of an actual interior illuminance after the user manipulation. The adjustment output outputs signals that adjust the light blocking element and the light management system component based on a minimum set point and a maximum set point. The controller adjusts at least one of the maximum set point and the minimum set point based on the interior illuminance value identified via the light sensor input after the user manipulation as identified via the user action input. The maximum set point is indicative of an occupied maximum desired level of the actual interior illuminance. The minimum set point is indicative of an occupied minimum desired level of the actual interior illuminance.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "light blocking element" may be any type of apparatus for a window for facilitating control of solar glare, brightness and veiling glare, contrasting brightness and veiling glare, illuminance ratios, solar heat gain or loss, uniformity of design and/or for providing a better interior environment for the occupants of a structure supporting increased productivity. Light blocking elements may include any type of covering for a window, such as, for example, blinds, drapes, shades, Venetian blinds, vertical blinds, roller blinds, adjustable louvers or panels, fabric coverings with and or without low E coatings, mesh, mesh coverings, window slats, metallic coverings and or the like. Light blocking elements may also comprise two or more different fabrics or types of coverings to achieve shading.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens (e.g., those of smart phones), PCs, laptops, Internet Appliances, infrared remotes, radio frequency remotes, microphones, PDAs, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
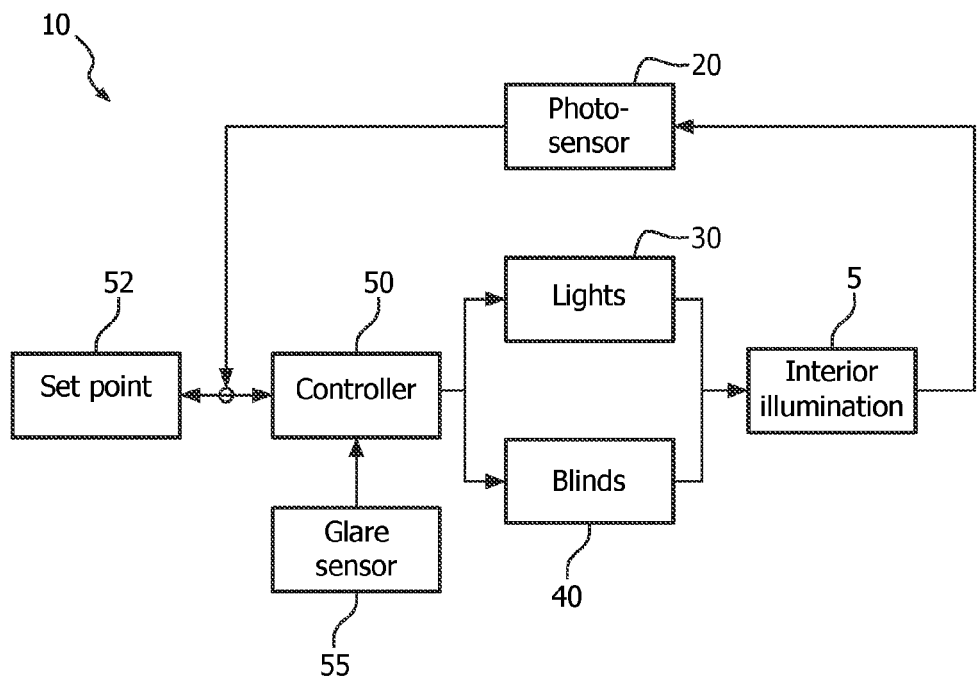
FIG. 1 illustrates an embodiment of a light management system.

Light management systems have been implemented that attempt to balance the admission of natural daylight and the application of artificial lighting in interior environments. The light management systems are intended to offer the benefit of energy savings via utilization of natural daylight under certain conditions, while maintaining a comfortable lighting environment for occupants of the interior environments. Some light management systems provide automatic control of blinds and/or automatic control of artificial lights to selectively provide artificial lighting to the interior environment. However, the automatic mode of the light management systems exhibits a rigid behavior based on a fixed desired lighting set-point pre-programmed at the factory and/or set at installation. Such fixed set-point may not provide desired illuminance to certain users and/or in certain situations. Thus, Applicants have recognized and appreciated a need to provide methods and apparatus for a light management system that may provide automatic operation tailored to user preferences derived from user interactions with the light management system.

More generally, Applicants have recognized and appreciated that it would be beneficial to provide inventive methods and apparatus disclosed related to adjusting a lighting parameter in a light management system based on user interaction with controls associated with light generating and/or light blocking elements, e.g. blinds, associated with the light management system.

In view of the foregoing, various embodiments and implementations of the present invention are directed to adjusting at least one lighting parameter based on user action.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the methods and apparatus disclosed herein are particularly suited for utilization in combination with blinds having an automatically or manually adjustable height and/or a plurality of actuably adjustable slats. Accordingly, for illustrative purposes, the claimed invention is often discussed in conjunction with such implementations. However, other configurations and applications of this approach are contemplated without deviating from the scope or spirit of the claimed invention. For example, other applications may interface with and/or include other actuable light blocking elements such as smart glass windows that enable change of light transmission properties via voltage application or other means.

Referring to FIG. 1, an embodiment of a light management system 10 is illustrated. An interior light sensor 20 is positioned in the interior environment and measures the interior illumination level 5. The light sensor 20 is in network communication with a controller 50 and may provide data indicative of the interior illumination level 5 to the controller 50. The controller 50 compares the data indicative of the interior illumination level 5 to at least one desired interior level set point of set points 52. Set points 52 may be stored in memory such as, for example, memory associated with controller 50. If there is a predetermined deviation from the desired interior level set point, then the controller 50 causes adjustment of the lights 30 and/or the blinds 40 in order to minimize the deviation. In some embodiments a tolerance around a chosen desired interior level set-point is used (e.g., +/−10%) to prevent too frequent blinds and/or light adjustments. In some versions of those embodiments, the tolerance may be an adjustable parameter. The controller 50 may be in network communication with the lights 30 and/or the blinds 40. For example, the controller 50 may be in communication with a driver of the lights 30 and an actuator of the blinds 40. For example, if the interior illumination level 5 is indicated to be below the desired illumination level set point 52, then light from the lights 30 may be increased and/or the blinds 40 may be actuated to let more natural daylight into the interior space. The state of the lights 30 and/or blinds 40 may at least in part define the interior illumination level 5. As described herein, in some embodiments an adjustable interior maximum set point and/or an adjustable interior minimum set point may be provided. The controller 50 may compare the data indicative of the interior illumination level 5 to one or both of the set points. For example, the controller 50 may compare the data indicative of the interior illumination level 5 to both set points in various situations in a manner similar to that described with respect to FIGS. 5-7.

For glare detection, an exterior glare sensor 55 may be provided in direct view of the exterior environment and/or in the exterior environment. For example, the exterior glare sensor 55 may be on the facade of a building or on the window in the exterior environment and measure the light level outside the interior area. The exterior glare sensor 55 is in network communication with the controller 50 and may provide data indicative of the exterior illumination level to the controller 50. The controller 50 compares the data indicative of the exterior illumination level to a desired exterior level set point of set points 52. If there is a predetermined deviation from the desired exterior level set point, then the controller 50 causes adjustment of the blinds 40 in order to minimize nuisance from glare caused by excessive exterior illumination levels. For example, a predetermined illumination level above the desired exterior level set point may signal glare nuisance and cause calculation and/or identification of the glare cut-off angle and cut-off height. The slats of the blinds 40 may then be set at the glare cut-off angle and/or the blinds 40 set at cut-off height to prevent and/or minimize direct sunlight from interfering with people sitting close to the windows with which the blinds 40 are associated. In some embodiments the glare cut-off angle and/or cut-off height may be determined using known theoretical models that utilize one or more inputs as variables such as, for example, latitude, longitude, orientation of window, date, local time, and/or slat geometry, etc. to block direct sunbeams hitting the occupant. In some embodiments the slats of the blinds 40 may be set at a plurality of angles. For example, the blinds 40 may be set to a plurality of values from fully open to fully closed and may move between fully open and fully closed in either rotational direction. Also, the height of the blinds 40 may be set at a plurality of heights between fully extended and fully retracted. When the glare sensor 55 detects glare, the permissible range of blind slat angle could be restricted between fully closed and the "cut-off angle". If no glare is detected, the blind slats may be allowed between the fully closed and fully open positions. Blind height may be set to the "cut-off height" using similar principles.

Figure 2:
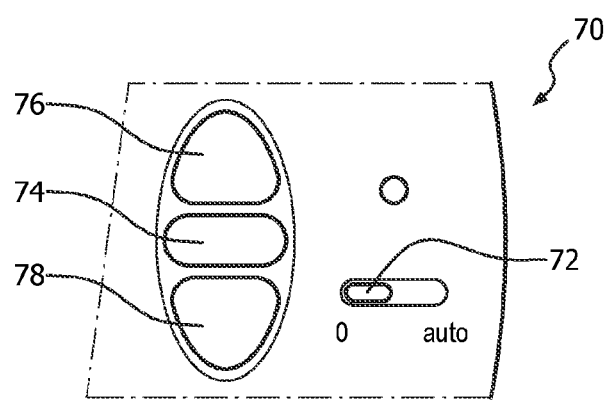
FIG. 2 illustrates an embodiment of a user interface that may interface with a light management system such as the light management system of FIG. 1 and/or the light management system of FIG. 5.

A user may additionally manually adjust the lights 30 and/or the blinds 40. For example, a user may activate, brighten, and/or dim the lights 30. Also, for example, a user may adjust the height and/or angle of the blinds 40. In some embodiments the user may utilize a user interface such as user interface 70 of FIG. 2 to switch between automatic and manual modes and/or to control the lights 30 and/or the blinds 40. For example, the user can choose whether the light management system 10 operates in a manual mode or automatic mode via toggle switch 72. Also, for example, the user can choose whether lights 30 or blinds 40 are being controlled via button 74. Up button 76 may be actuated to raise the illumination level of the lights 30 when they are being controlled and down button 78 may be actuated to lower the illumination level of the lights 30. Up button 76 may be actuated to raise the blinds 40 and/or adjust the slat angle in a first direction when they are being controlled and down button 78 may be actuated to lower the blinds 40 and/or adjust the slat angle in a second direction. In some embodiments, after a timeout period, the system may automatically switch back into the automatic mode.

In some embodiments, the user may additionally and/or alternatively make adjustments to the lights 30 and/or the blinds 40 in the manual mode and/or the automatic mode. In some versions of those embodiments user adjustments made in the manual mode may stay locked while in the manual mode despite changes to the interior illumination level 5 due to changing natural lighting conditions. In some versions of those embodiments user adjustments made in the automatic mode may adjust the lights 30 and/or the blinds 40 in the short term, but the lights 30 and/or the blinds 40 may be further automatically adjusted as natural lighting conditions change. As described herein, in some embodiments the adjustable interior maximum set point and/or the adjustable interior minimum set point may be adjusted based at least in part on the manual adjustments made by the user (made in either the manual mode and/or the automatic mode). For example, the controller 50 may adjust the interior maximum set point and/or the adjustable interior minimum set point based at least in part on the manual adjustments made by the user in a manner similar to that described with respect to FIGS. 5-7.

Figure 3:
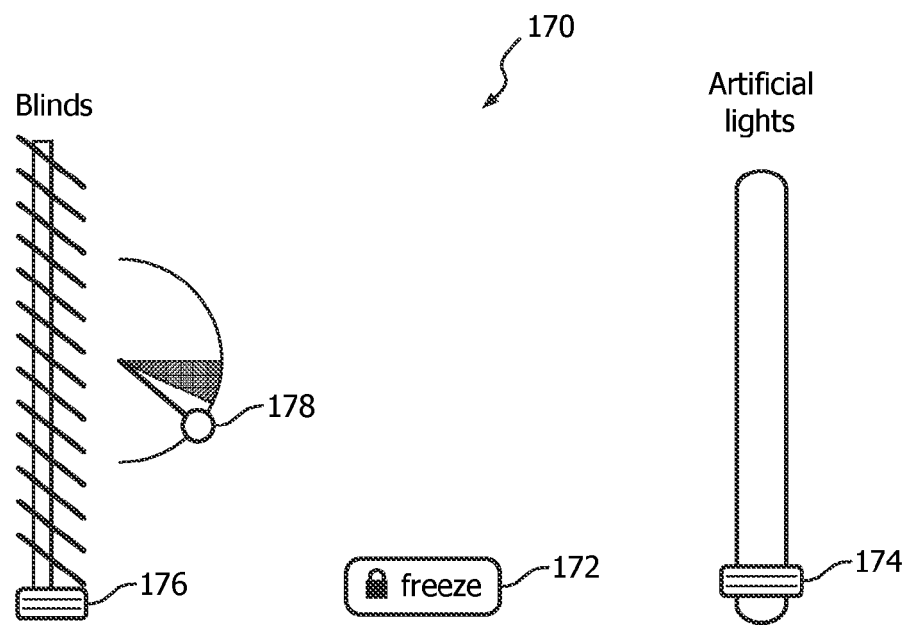
FIG. 3 illustrates another embodiment of a user interface that may interface with a light management system such as the light management system of FIG. 1 and/or the light management system of FIG. 5.
Figure 5:
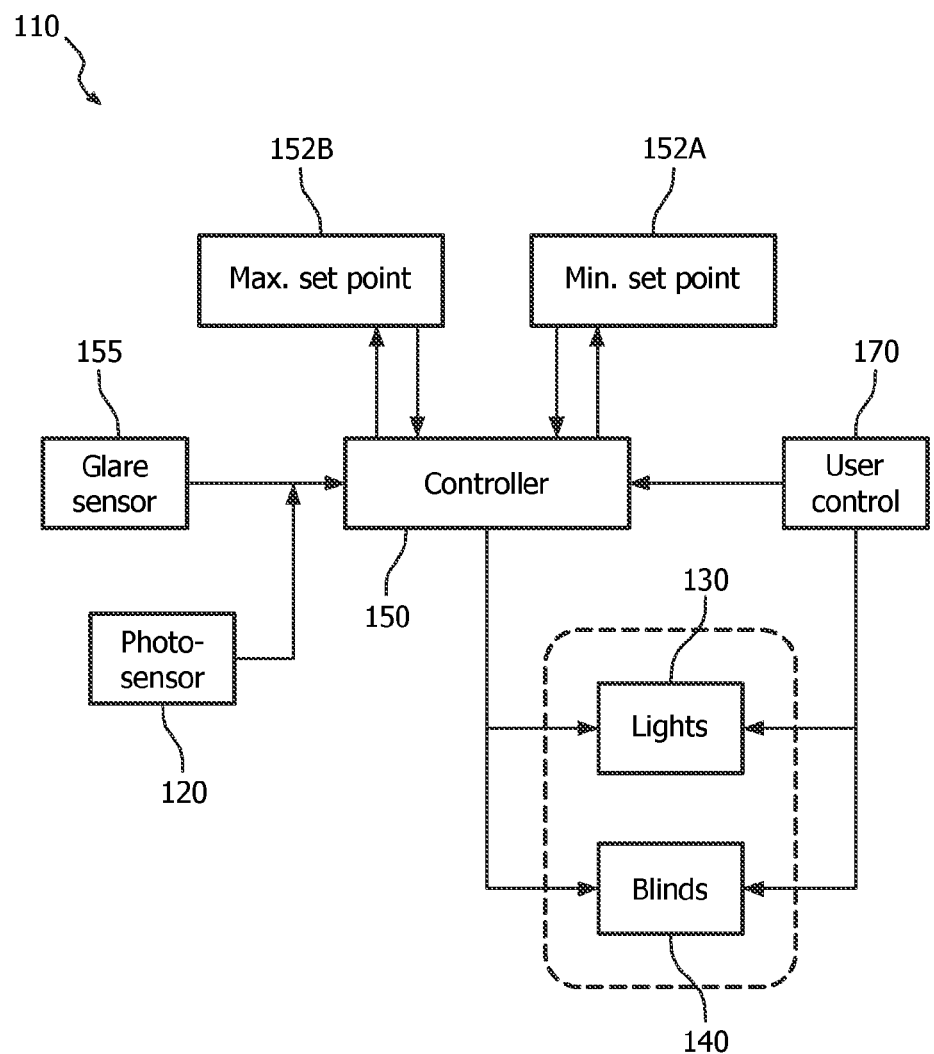
FIG. 5 illustrates another embodiment of a light management system.

FIG. 3 illustrates another embodiment of a user interface 170 that may interface with the light management system 10 of FIG. 1 and/or the light management system 110 of FIG. 5. In some embodiments the user interface 170 may be viewable via an electronic display device and actuable via an input associated with the electronic display device. For example, in some embodiments the user interface 170 may be visible on a touch screen display and actuable via the touch screen display. Also, for example, in some embodiments the user interface 170 may be visible on a monitor and actuable via one or more inputs such as a mouse and/or keyboard. The user can lock the system in a manual mode via freeze/lock button 172 and prevent the system from making any automatic adjustments to the blinds and artificial lights while locked in the manual mode. The user may also make manual adjustments while not in the manual mode, but those adjustments may not be necessarily fixed as changes to natural lighting occur. For example, when the user is not in the manual mode she may adjust the artificial lights to obtain desired light in the room. As described herein, such adjustment may be utilized to adjust one or more set points of the light management system. A subsequent change in daylight may cause the artificial lighting to be adjusted (within the parameters of the one or more adjusted set points), while still maintaining the desired light in the room.

The user can control the illumination level of lights of the light management system in the locked manual mode and/or the automatic mode via slide switch 174. For example, the lowest position of the slide switch 174 may turn the lights off and raising the slide switch up may gradually increase the light level. In some embodiments the user interface 170 may also display the current setting of the light management system. For example, as the illumination level of the artificial lights is adjusted (automatically or manually), the slide switch 174 will be raised/lowered to reflect the adjustment.

The user can control the height and angle of blinds of the light management system in the locked manual mode and/or the automatic mode via respective of slide switch 176 and pivot switch 178. For example, the lowest position of the slide switch 176 may lower the blinds completely and raising the slide switch up may gradually raise the blinds. Also, for example, the pivot switch 178 may be pivoted to correspondingly rotate the blinds to a desired blind angle. As illustrated in FIG. 3, the graphic display of the blinds in the user interface 140 may show the changes to the blind height via switch 176 and/or the blind angle via switch 178.

Figure 4:
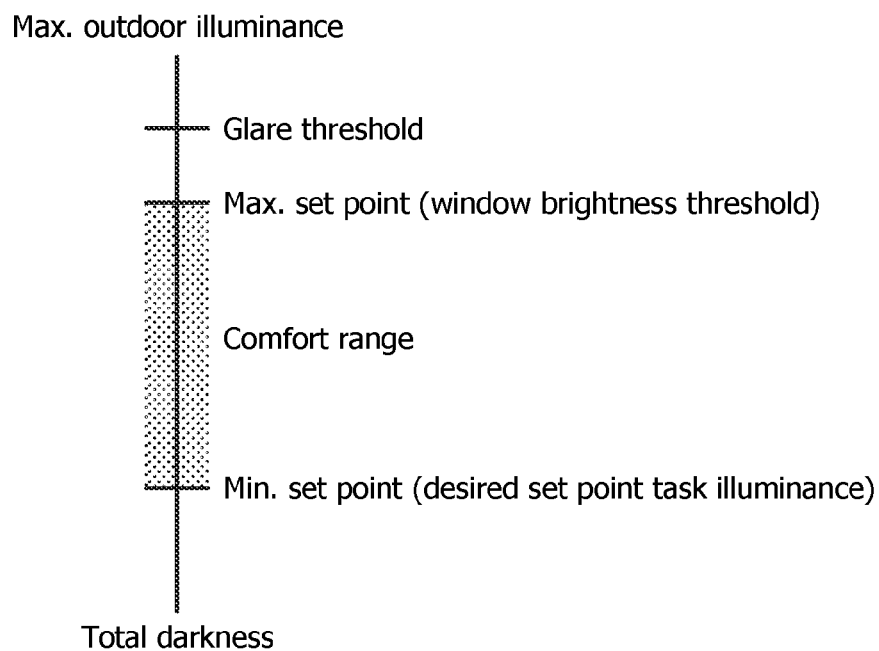
FIG. 4 illustrates an example comfort range defined by a minimum set point and a maximum set point.

FIG. 4 illustrates an example comfort range defined by a minimum set point and a maximum set point. A glare threshold and total darkness level are also illustrated outside of the comfort range. The glare threshold is indicative of an illuminance value that represents a glare boundary for light produced by direct sun. In some embodiments the glare threshold could be user adjustable. In some embodiments the glare threshold may additionally and/or alternatively depend on user adjustments that lead to the minimum and/or maximum set-point adjustments and/or user override actions like glare cut-off angle override and/or glare-height override. In some embodiments whether the glare boundary is met may be determined based on measurements from one or more sensors that measure exterior facing vertical illuminance that is incident on a window. For instance, the sensor may be provided on the exterior façade of a building adjacent a window to be measured. Total darkness is indicative of the illuminance value produced by no or very little light.

The maximum set point is indicative of the upper value for visual comfort for a user, representing a comfortable window surface brightness. In some embodiments whether the window surface brightness boundary is met may be determined based on measurements from one or more ceiling mounted photo sensors that are calibrated during commissioning to estimate work plane illuminance. In some embodiments, due to ceiling sensor range limitation, data from the sensor that measures exterior facing vertical illuminance may be utilized in combination with data from the ceiling sensor to estimate window brightness at high illuminance levels. The minimum set point is indicative of the desired task illuminance level. In some embodiments whether the minimum set point boundary is met may be determined based on measurements from one or more ceiling mounted photo sensors that are optionally calibrated during commissioning to estimate work plane illuminance. In some embodiments the minimum set point may be restricted to a value within a range such as a range of approximately 0 to 500 lux. In some embodiments the upper limit of the range may be based on the illuminance that may be provided by artificial lighting in the light management system. The comfort range is the range between the minimum set point and the maximum set point.

As described herein, in some embodiments the comfort range may be adjustable via adjustment of the minimum set point and/or the maximum set point. In some embodiments the adjustment of the comfort range may be based on user actions and optionally readings from one or more sensors indicative of interior illumination levels.

For example, the maximum set point may be adjusted based on user actions on a bright sunny day. For example, the user may adjust the blinds (e.g., at the blinds directly or using the user interface 70 or 170) to determine the maximum acceptable window brightness on a bright sunny day. One or more sensors could then identify the window surface brightness after adjustment of the blinds and/or a corresponding work plane illuminance and set the maximum set point based on the window surface brightness and/or a corresponding work plane illuminance. For example, an outdoor façade mounted sensor or a window mounted sensor may be utilized for establishing the threshold maximum value for the window brightness. Also, for example, a ceiling mounted indoor sensor could be calibrated to establish a correspondence between the ceiling measurement and the desk illuminance due to daylight.

Continuing the example, as daylight conditions change and illumination levels become less than the maximum set-point the system starts to partially open the blinds until completely open to maintain the interior illumination level at greater than the minimum set point without adding artificial lighting until the point when the interior illumination level drops below the minimum set-point level. Upon dropping below the minimum set-point level, the system starts adding artificial lighting to maintain interior illumination level to be no less than the minimum set-point. User adjustment of the artificial lighting upward or downward may then be utilized to adjust the minimum set point upward or downward. For example, if the user further manually dimmed the lights after the minimum set-point was reached, the minimum set-point may be adjusted downward based on measurements indicative of the interior illumination level after the user further dimmed the lights.

FIG. 5 illustrates another embodiment of a light management system 110. An interior light sensor 120 is positioned in the interior environment and measures the interior illumination level. The light sensor 120 is in network communication with a controller 150 and may provide data indicative of the interior illumination level to the controller 150. The controller 150 compares the data indicative of the interior illumination level to at least one of the minimum set point 152A and the maximum set point 152B. Set points 152A, 152B may be stored in memory such as, for example, memory associated with controller 150. If there is a predetermined deviation from the minimum set point 152A and/or the maximum set point 152B (e.g., deviation below the minimum set point 152A or above or below the maximum set point 152B), then the controller 150 may cause adjustment of the lights 130 and/or the blinds 140 in certain situations in order to minimize the deviation.

For glare detection, a glare sensor 155 may be provided in direct view of the exterior environment and/or in the exterior environment. For example, the glare sensor 155 may be on the facade of a building or on the window in the exterior environment and measure the light level outside the interior area. The glare sensor 155 is in network communication with the controller 150 and may provide data indicative of the exterior illumination level to the controller 150. The controller 150 compares the data indicative of the exterior illumination level to a glare set point. If there is a predetermined deviation from the glare set point, then the controller 150 causes adjustment of the blinds 140 in order to minimize nuisance from glare caused by excessive exterior illumination levels. For example, the blinds 140 may be adjusted to be at least at a cut-off angle and/or a cut-off height.

A user may additionally manually adjust the lights 130 and/or the blinds 140. For example, in some embodiments the user may utilize a user interface such as user interface 170 to adjust the lights 130 and/or the blinds 140 while the light management system 110 is operating in an automatic mode. Also, for example, in some embodiments the user may switch the light management system 110 to a locked freeze mode that takes it completely out of the automatic mode. As described herein, in some embodiments the minimum set point 152A and/or the maximum set point 152B may be adjusted based at least in part on the manual adjustments made by the user.

In some embodiments multiple sets of blinds 140 and/or multiple sets of lights 130 may be provided. The blinds 140 and/or lights 130 may be controlled individually and/or cooperatively. Also, in some embodiments multiple interior light sensors 120 and/or multiple glare sensors 155 may be provided. The multiple sensors 120 and/or 155 may all provide data relative to settings for a single set of cooperatively controlled lights 130 and/or blinds 140 or may provide data relative to multiple sets of separately controlled lights 130 and/or blinds 140. For example, in some embodiments a first set of sensors 120 and 155 may provide data indicative of interior and/or exterior light affecting a first interior space for control of a first set of lights 130 and blinds 140 and a second set of sensors 120 and 155 may provide data indicative of interior and/or exterior light affecting a first interior space for control of a second set of lights 130 and blinds 140. A single controller 150 may optionally control multiple sets of blinds 140 and/or multiple sets of lights 130.

In some embodiments, during automatic operation of the light management system 110 of FIG. 5, all or aspects of the following logic may be utilized to control the blinds 140. Such logic may be implemented in controller 150. If the glare sensor 155 detects an illumination level indicative of glare, then the "fully open" state of the blinds 140 may be set by the controller 150 to be equal to the cut-off angle of the blinds. Setting the fully open state of the blinds 140 to the cut-off angle may prevent and/or minimize direct sunlight from the glare based on the identified and/or determined cut-off angle. If the interior illumination level as determined based on measurements from one or more photo sensors 120 (e.g., ceiling mounted photo sensors positioned and/or calibrated to estimate work plane illuminance) is greater than the maximum set point 152B, then the blinds 140 are gradually closed until the interior illumination is approximately equal to the maximum set point 152B. For example, the blinds 140 may be closed one step at a time until the interior illumination is approximately equal to the maximum set point 152B. If, on the other hand, the interior illumination as determined based on measurements from one or more photo sensor 120 is less than the maximum set point 152B, then the blinds 140 are opened until the interior illumination is approximately equal to the maximum set point 152B, or, until the blinds 140 are in the fully open state. For example, the blinds 140 may be opened one step at a time until the interior illumination is approximately equal to the maximum set point 152B.

If data indicative of an interior illuminance value indicates an interior illuminance that is greater than the maximum set point 152B, and the height of the blinds 140 is greater than a cut-off height of the blinds, then the height of the blinds 140 may be adjusted to the cut-off height. The cut-off height of the blinds may prevent and/or minimize direct sunlight from the glare based on the identified and/or determined cut-off height. The cut-off height may be utilized in addition to or as an alternative to the cut-off angle. For example, in some embodiments (e.g., when roller blinds are utilized), only the cut-off height and the control of the cut-off height as described herein may be relevant. In some embodiments the interior illuminance value may be determined, for example, based on input from the interior light sensor 120 and/or the glare sensor 155. If data indicative of an interior illuminance value indicates an interior illuminance that is less than the minimum set point 152B, and the height of the blinds 140 is less than a cut-off height of the blinds, then the height of the blinds 140 may be adjusted to the cut-off height.

If the user alters the state of the blinds 140 during automatic operation of the light management system 110, the following adjustments to one of the minimum set point 152A and the maximum set point 152B may be made by the controller 150. In some embodiments the user may alter the blinds 140 via user interface 170 and such alteration may be received by and/or directed by the controller 150. If the glare sensor 155 detects an illumination level indicative of glare, and the user opens the blinds 140 to an angle that is greater than the cut off angle, then the maximum set point may be set to the interior illuminance value as indicated via, for example, the interior sensor 120. The maximum set point may be set based on the interior illuminance value as determined temporally close to after the user adjustment.

If the glare sensor 155 detects an illumination level indicative of glare, the user has closed the blinds 140 to an angle that is less than the cut off angle, and the interior illuminance value is greater than the minimum set point 152A, then the maximum set point 152B may be set to the interior illuminance value as indicated via, for example, the interior sensor 120; else, if the interior illumination level is less than the minimum set point, then the maximum set point is set to be substantially equal to the minimum set point. The set points may be set based on the interior illuminance value as determined temporally close to after the user adjustment.

If the glare sensor 155 does not detect an illumination level indicative of glare, the user has adjusted the blinds 140 (e.g., slat angle adjustment and/or height adjustment), and the interior illuminance value is greater than the minimum set point 152A, then the maximum set point may be set to the interior illuminance value as indicated via, for example, the interior sensor 120; else, if the interior illumination level is less than the minimum set point, then the maximum set point is set to be substantially equal to the minimum set point. In some embodiments the maximum set-point may be related to the minimum set point based on a factor. For example, in some embodiments if the interior illumination level is less than the minimum set point, then the maximum set point may be set to be the minimum set point modified by a factor X. For example, if the interior illumination level is less than the minimum set point, then the maximum set point may be set to be equal to the minimum set point multiplied by the factor X (e.g., minimum set point*X=1.2). Also, for example, if the interior illumination level is less than the minimum set point, then the maximum set point may be set to be equal to the minimum set point plus the factor X (e.g., minimum set point+X=100 lux). in some embodiments the factor X may be a variable factor that is adjustable based on user input (e.g., user adjustment of the lights and/or blinds). For example, if the interior illumination level is greater than the minimum set point, and greater that the minimum set-point times factor X, then the factor X may be adjusted to be substantially equal to the interior illumination level divided by the minimum set-point. In some embodiments the set points may be set based on the interior illuminance value as determined temporally close to after the user adjustment.

Figure 6:
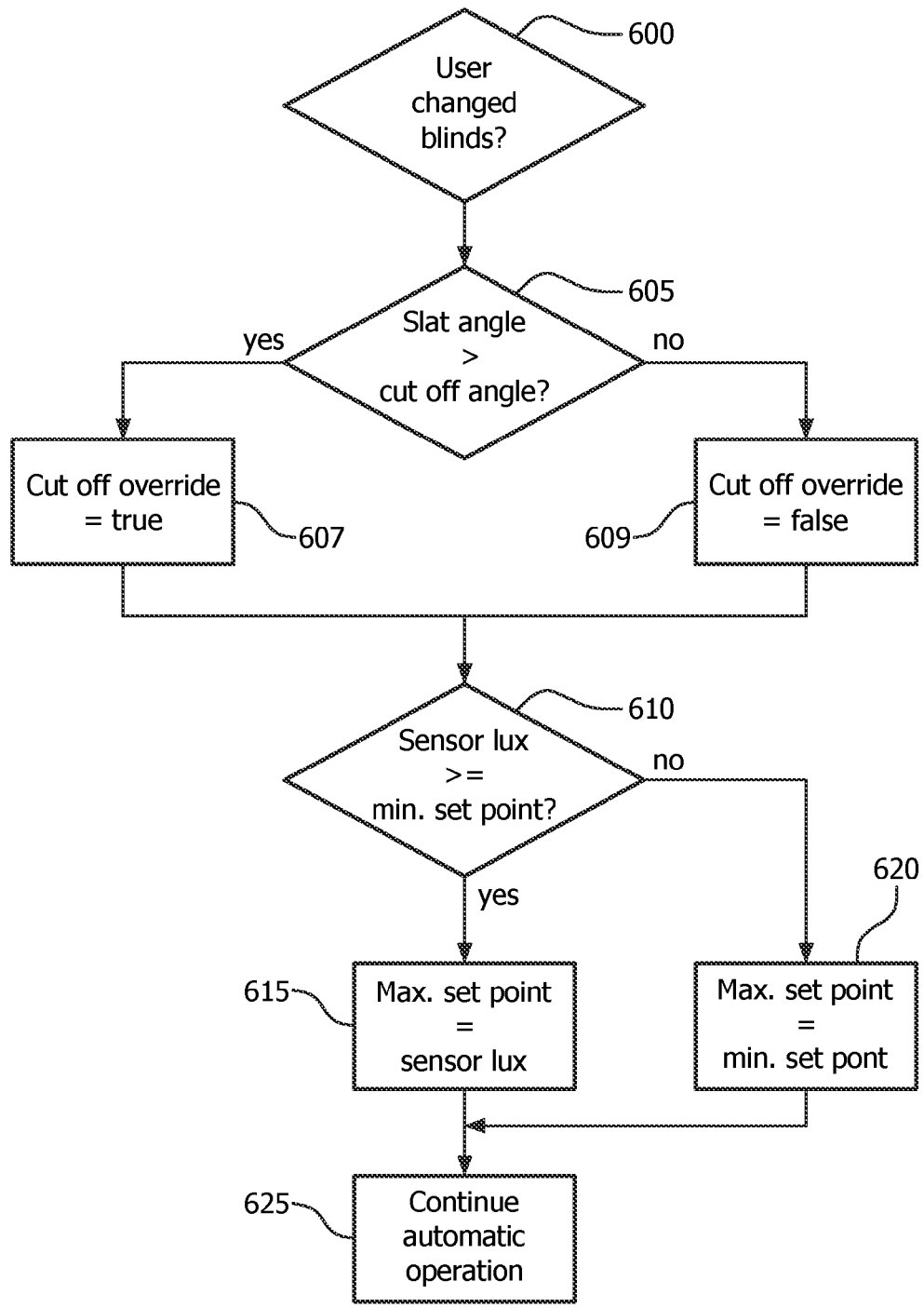
FIG. 6 illustrates a flow chart of an embodiment of adjustment of control parameters of a light management system in response to a user adjustment of blinds of the light management system.

FIG. 6 illustrates a flow chart illustrating an implementation of an embodiment of adjustment of control parameters of a light management system in response to a user adjustment of blinds of the light management system. Other implementations may perform the steps in a different order, omit certain steps, and/or perform different and/or additional steps than those illustrated in FIG. 6. For convenience, aspects of FIG. 6 will be described with reference to one or more light management system components that perform the process and/or that interface with the process. The components may be, for example, the controller 150 of FIG. 5.

At step 600 it is determined whether the user has manipulated the state of the blinds 140 during automatic operation of the light management system 110. In some embodiments the user may alter the blinds 140 via user interface 170 and such alteration may be received by and/or directed by the controller 150. At step 605 it is determined whether the slat angle of the blinds 140 as adjusted by the user is greater than the cut-off angle of the blinds 140. In some embodiments the slat angle of the blinds 140 may be determined via input from user interface 170 and/or via feedback from blinds 140. If the slat angle of the blinds 140 is greater than the cut-off angle of the blinds 140, then the cut-off override is enabled at step 607. If the slat angle of the blinds 140 is not greater than the cut-off angle of the blinds 140, then the cut-off override is disabled at step 607. In some embodiments the cut-off override may enable temporary override of the cut-off angle in glare situations to enable the slats of the blinds 140 to remain at an angle that does not achieve cut-off for a predetermined amount of time and/or until further changes in natural lighting conditions occur. In some embodiments the cut-off override may enable override of the cut-off angle in operation of the light management system 110 until the user manually adjusts the slat angle of the blinds 140 to an angle that is not greater than the cut-off angle. As discussed, herein, the cut-off angle may be dynamic and may be based on one or more measured and/or identified parameters.

At step 610 it is determined whether data indicative of an interior illuminance value indicates an interior illuminance that is greater than or equal to the minimum set point 152A. In some embodiments the data indicative of the interior illuminance value may include a lux value measured by the photo sensor 120. In some embodiments the photo sensor 120 may be a ceiling mounted photo sensor positioned and/or calibrated to estimate work plane illuminance. If the interior illuminance is not determined to be greater than or equal to the minimum set point 152A, then at step 620 the maximum set point 152B is set to approximately equal the minimum set point 152A. If the interior illuminance is determined to be greater than or equal to the minimum set point 152A, then at step 620 the maximum set point 152B is set to approximately equal the illuminance value as indicated via, for example, the interior sensor 120.

At step 625, automatic operation of the light management system 110 may be continued utilizing the newly adjusted maximum set point 152B. For example, the light management system 110 may continue to automatically adjust blinds 140 and/or lights 130 to maintain the interior illuminance within a comfort range between the maximum set point 152B and the minimum set point 152A. For example, the light management system 110 may automatically adjust blinds 140 and/or lights 130 based on input from sensors 120 and/or 155 and the set points 152A, 152B. For instance, the light management system 110 may adjust blinds 140 and/or lights 130 according to one or more methods described herein.

In some embodiments, during automatic operation of the light management system 110 of FIG. 5, all or aspects of the following logic may be utilized to control the lights 130. Such logic may be implemented in controller 150. If the interior illumination as determined based on measurements from one or more photo sensors 120 (e.g., ceiling mounted photo sensors positioned and/or calibrated to estimate work plane illuminance) is less than the minimum set point 152A, then the light output of the lights 130 is increased until the interior illumination is approximately equal to the minimum set point 152A. If the interior illumination as determined based on measurements from one or more photo sensors 120 is greater than the minimum set point 152A, then the light output of the lights 130 is decreased until the interior illumination is approximately equal to the minimum set point 152A or until lights 130 are turned off.

If the user alters the state of the lights 130 during automatic operation of the light management system 110, the following adjustments to one of the minimum set point 152A and the maximum set point 152B may be made by the controller 150. If the user manually adjusts the lights 130 and the interior illumination as determined based on measurements from one or more photo sensors 120 is less than the artificial lighting threshold and is less than the maximum set point 152B, then the minimum set point 152A may be adjusted based on the interior illuminance value as indicated via, for example, the interior sensor 120. In some embodiments the artificial lighting threshold may be based on the maximum amount of illumination that may be provided by lights 130. In some embodiments the minimum set point 152A is set to be substantially equal to the interior illuminance value as measured after adjustment.

If the user manually adjusts the lights 130 and the interior illumination as determined based on measurements from one or more photo sensors 120 is greater than the artificial lighting threshold and is greater than the maximum set point 152B, then the maximum set point 152B may be adjusted based on the interior illuminance value as indicated via, for example, the interior sensor 120. In some embodiments the minimum set point 152B is set to be substantially equal to the interior illuminance value as measured after the user adjustment.

Figure 7:
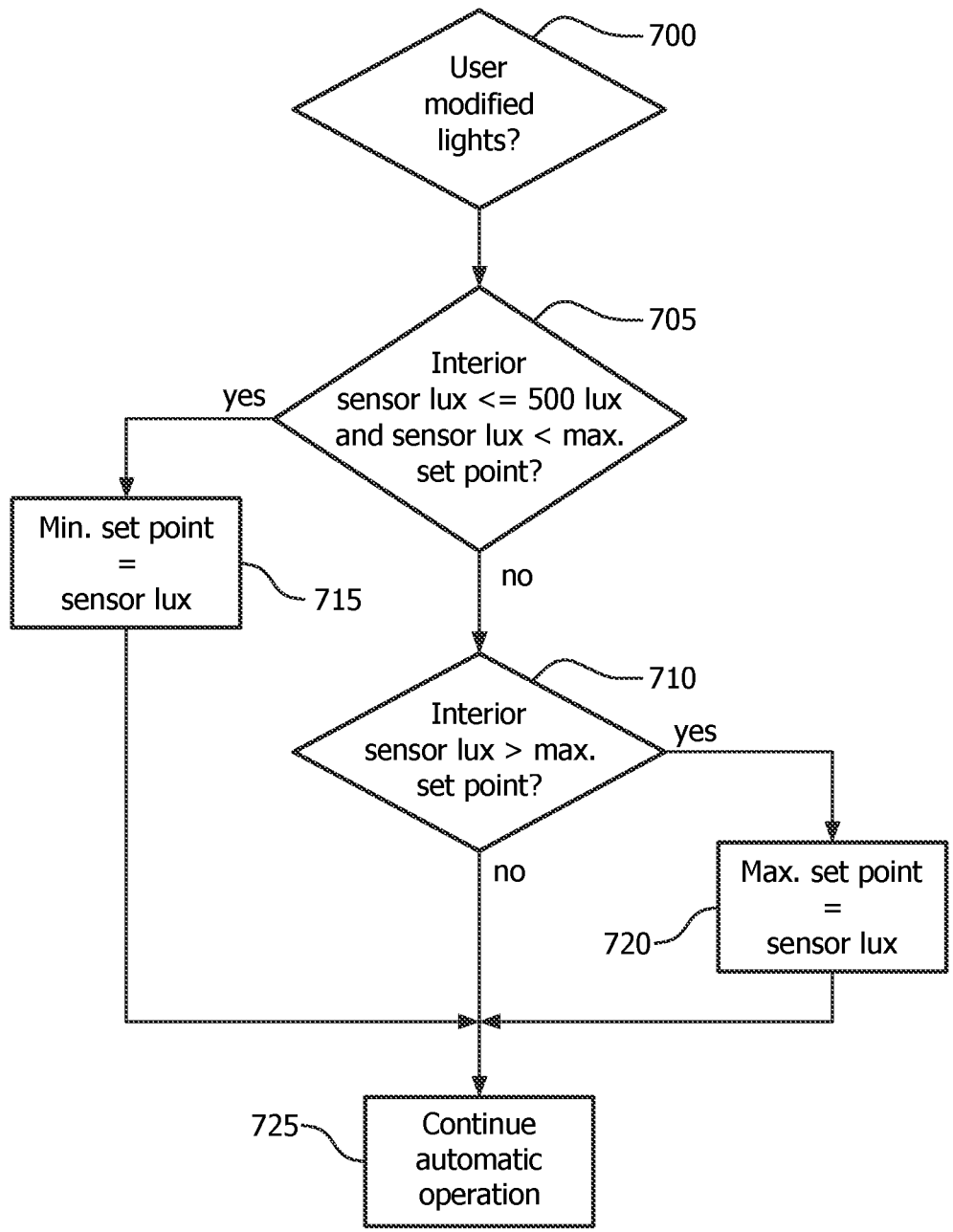
FIG. 7 illustrates a flow chart of an embodiment of adjustment of control parameters of a light management system in response to a user adjustment of artificial lighting of the light management system.

FIG. 7 illustrates a flow chart illustrating an implementation of an embodiment of adjustment of control parameters of a light management system in response to a user adjustment of artificial lighting of the light management system. Other implementations may perform the steps in a different order, omit certain steps, and/or perform different and/or additional steps than those illustrated in FIG. 7. For convenience, aspects of FIG. 7 will be described with reference to one or more light management system components that perform the process and/or that interface with the process. The components may be, for example, the controller 150 of FIG. 5.

At step 700 it is determined whether the user has manipulated the state of the lights 130 during automatic operation of the light management system 110. In some embodiments the user may alter the lights 130 via user interface 170 and such alteration may be received by and/or directed by the controller 150. At step 705 it is determined whether data indicative of an interior illumination level is less than or equal to an artificial lighting threshold and less than maximum set point 152B. In some embodiments the artificial lighting threshold may be based on the amount of illumination that may be provided by lights 130. For example, in some embodiments the artificial lighting threshold may be based on the maximum amount of the illumination that may be provided by lights 130. In FIG. 7, the artificial lighting threshold is 500 lux. Other artificial lighting thresholds may optionally be utilized.

If data indicative of an interior illumination level is less than or equal to an artificial lighting threshold and less than maximum set point 152B, then the minimum set point 152A is set to be approximately equal to the measured interior illumination level at step 715 as indicated via, for example, the interior sensor 120. If data indicative of an interior illumination level is not less than or equal to an artificial lighting threshold and less than maximum set point 152B, then at step 710 it is determined whether the data indicative of an interior illumination level is greater than the maximum set point 152B. If the data indicative of an interior illumination level is greater than the maximum set point 152B, then at step 720 the maximum set point 152B is set to be approximately equal to the measured interior illumination level as indicated via, for example, the interior sensor 120. The minimum set point 152A and/or the maximum set point 152B may be set based on the interior illuminance value as determined temporally close to after the user adjustment.

If the data indicative of an interior illumination is not greater than the maximum set point 152B, then no adjustments to the minimum set point 152A or the maximum set point 152B are made and, at step 725 automatic operation of the light management system 110 may be continued utilizing the previous set points 152A, 152B. If the minimum set point 152A is adjusted at step 715 or the maximum set point 152B is adjusted at step 720, then at step 725 automatic operation of the light management system 110 may be continued utilizing the newly adjusted set point 152A or 152B. For example, the light management system 110 may continue to automatically adjust blinds 140 and/or lights 130 to maintain the interior illuminance within a comfort range between the maximum set point 152B and the minimum set point 152A. For example, the light management system 110 may automatically adjust blinds 140 and/or lights 130 based on input from sensors 120 and/or 155 and the set points 152A, 152B. For instance, the light management system 110 adjusts blinds 140 and/or lights 130 according to one or more methods described herein.

In some embodiments, the system may enter a locked manual mode in response to input from a user. For example, the freeze/lock button 172 may be actuated to prevent the system from making any automatic adjustments to the blinds 140 and artificial lights 130 while locked in the manual mode. In the locked manual mode the user controls the blinds 140 and artificial lights 130. In some embodiments the light management system 110 may stay in the locked manual mode until switched off (e.g., via button 172), until the interior space is vacated, and/or until the end of the day. In some embodiment the light management system 110 may operate in additional and/or alternative manners based on the same and/or additional inputs or considerations. For example, demand response events may cause different actions of lights 130 and/or blinds 140 in certain circumstances.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims, if any, are provided merely for convenience and should not be construed as limiting the claims in any way.

What is claimed is:

1. A method of adjusting a lighting parameter in a light management system based on user action, comprising:
   identifying a user manipulation of a light management system component, said user manipulation including one of a user light manipulation of at least one light of the light management system and a user blind manipulation of at least one light blocking element of the light management system;
   identifying an interior illuminance value indicative of an actual interior illuminance after said user manipulation;
   wherein said actual interior illuminance after said user manipulation is dependent at least in part on said user manipulation, and
   wherein said interior illuminance value is based on a measurement by a light sensor of said actual interior illuminance after said user manipulation;
   adjusting, in response to said user manipulation, one of a minimum set point and a maximum set point associated with said light management system; and
   adjusting said maximum set point based on said minimum set point modified by a factor,
   wherein said at least one of said minimum set point and said maximum set point is adjusted based on said interior illuminance value after said user manipulation;
   wherein said maximum set point is indicative of an occupied maximum desired level of said actual interior illuminance; and
   wherein said minimum set point is indicative of an occupied minimum desired level of said actual interior illuminance.

2. The method of claim 1, further comprising adjusting said maximum set point in response to said user blind manipulation when said interior illuminance value is greater than said minimum set point, and wherein said maximum set point is adjusted based on said interior illuminance value after said user manipulation.

3. The method of claim 2, wherein said maximum set point is adjusted to substantially equal said interior illuminance value after said user manipulation when adjusted in response to said user blind manipulation when said interior illuminance value is greater than said minimum set point.

4. The method of claim 1, further comprising adjusting said maximum set point in response to said user blind manipulation when said interior illuminance value is less than said minimum set point and wherein said maximum set point is adjusted based on said minimum set point.

5. The method of claim 4, wherein said maximum set point is adjusted to substantially equal said minimum set point when adjusted in response to said user blind manipulation when said interior illuminance value is less than said minimum set point.

6. The method of claim 1, further comprising adjusting said minimum set point in response to said user light manipulation when said interior illuminance value is less than said maximum set point and wherein said minimum set point is adjusted based on said interior illuminance value after said user manipulation.

7. The method of claim 6, wherein said minimum set point is adjusted in response to said user light manipulation when said interior illuminance value is less than said maximum set point to substantially equal said interior illuminance value.

8. The method of claim 1, further comprising adjusting said maximum set point in response to said user light manipulation when said interior illuminance value is greater than said maximum set point and wherein said maximum set point is adjusted based on said interior illuminance value.

9. The method of claim 8, wherein said maximum set point is adjusted in response to said user light manipulation when said interior illuminance value is greater than said maximum set point to substantially equal said interior illuminance value.

10. The method of claim 1, further comprising increasing a light output of said lights when said interior illuminance value is less than said minimum set point.

11. The method of claim 1, wherein said at least one light blocking element includes blind slats and further comprising increasing an amount of light passage of said blind slats when said interior illuminance value is less than said maximum set point.

12. A method of adjusting a lighting parameter in a light management system based on user actions, comprising:
    identifying a user light manipulation of at least one light of the light management system;
    identifying an interior illuminance value indicative of an actual interior illuminance influenced by said light management system;
    adjusting a minimum set point associated with said light management system in response to said user light manipulation;
        wherein said minimum set point is adjusted in response to said user light manipulation when said interior illuminance value after said light manipulation is less than a maximum set point and is adjusted based on said interior illuminance value after said light manipulation;
    identifying a user light blocking element manipulation of at least one light blocking element associated with the light management system;
    adjusting the maximum set point associated with said light management system in response to said user light blocking element manipulation;
        wherein said maximum set point is adjusted in response to said user light blocking element manipulation and is adjusted based on said interior illuminance value after said light blocking element manipulation;
    wherein said maximum set point is indicative of an occupied maximum desired level of said actual interior illuminance; and
    wherein said minimum set point is indicative of an occupied minimum desired level of said actual interior illuminance.

13. The method of claim 12, wherein said maximum set point is adjusted based on said interior illuminance value when said interior illuminance value is greater than said minimum set point.

14. The method of claim 13, further comprising adjusting said maximum set point in response to said user light manipulation when said interior illuminance value after said light manipulation is greater than said maximum set point and wherein said maximum set point is adjusted based on said interior illuminance value after said light manipulation.

15. A controller for a light management system having a light source, light blocking element, and a light sensor, comprising:
    a user action input, said user action input providing identification of a user manipulation of a light management system component, said user manipulation including one of a user light manipulation of at least one light of the light management system and a user light blocking element manipulation of at least one light blocking element of the light management system;
    a light sensor input, said light sensor input identifying an interior illuminance value indicative of an actual interior illuminance after said user manipulation;
    wherein said actual interior illuminance after said user manipulation is dependent at least in part on said user manipulation, and
    wherein said interior illuminance value is based on a measurement by the light sensor of said actual interior illuminance after said user manipulation;
    an adjustment output, said adjustment output outputting signals that adjust said light blocking element and said light management system component based on a minimum set point and a maximum set point associated with said light management system;
    wherein said controller adjusts at least one of said maximum set point and said minimum set point based on said interior illuminance value identified via said light sensor input after said user manipulation as identified via said user action input;
    wherein said maximum set point is indicative of an occupied maximum desired level of said actual interior illuminance; and
    wherein said minimum set point is indicative of an occupied minimum desired level of said actual interior illuminance.

16. A method of adjusting a lighting parameter in a light management system based on user action, comprising:
    identifying a user manipulation of a light management system component, said user manipulation including one of a user light manipulation of at least one light of the light management system and a user blind manipulation of at least one light blocking element of the light management system;
    identifying an interior illuminance value indicative of an actual interior illuminance after said user manipulation;
    wherein said actual interior illuminance after said user manipulation is dependent at least in part on said user manipulation;
    adjusting, in response to said user manipulation, one of a minimum set point and a maximum set point associated with said light management system;

wherein said at least one of said minimum set point and said maximum set point is adjusted based on said interior illuminance value after said user manipulation;

wherein said maximum set point is indicative of an occupied maximum desired level of said actual interior illuminance;

wherein said minimum set point is indicative of an occupied minimum desired level of said actual interior illuminance;

wherein said adjusting one of said minimum set point and said maximum set point comprises adjusting said maximum set point in response to said user blind manipulation when said interior illuminance value is greater than said minimum set point, and wherein said maximum set point is adjusted based on said interior illuminance value after said user manipulation.

17. The method of claim 1, wherein said maximum set point is adjusted to substantially equal said interior illuminance value after said user manipulation when adjusted in response to said user blind manipulation when said interior illuminance value is greater than said minimum set point.

\* \* \* \* \*